Jan. 23, 1945.  L. P. DEMPSEY  2,367,760
ELECTRODE HOLDER
Filed Nov. 18, 1942
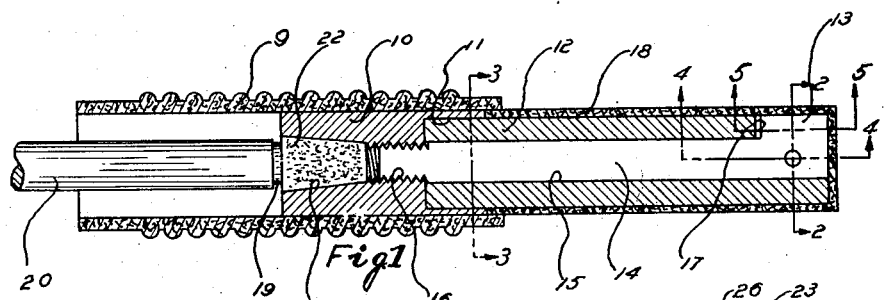
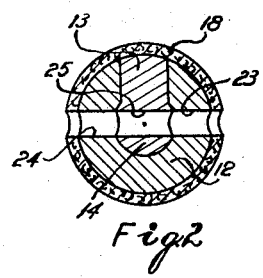
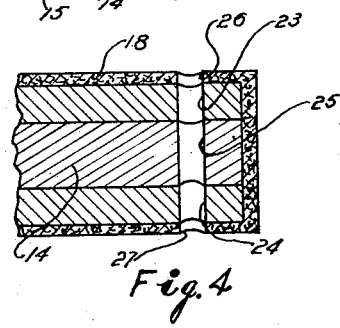
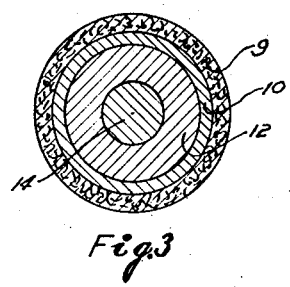
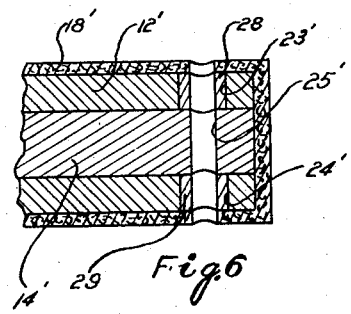
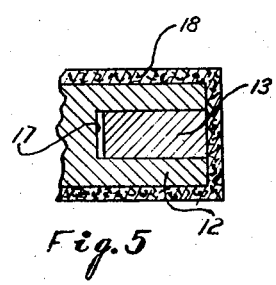
INVENTOR.
LEWIS P. DEMPSEY
BY Patented Jan. 23, 1945

2,367,760

UNITED STATES PATENT OFFICE 2,367,760

ELECTRODE HOLDER

Lewis P. Dempsey, Detroit, Mich.

Application November 18, 1942, Serial No. 466,069

5 Claims. (Cl. 219—8)

My invention relates to a new and useful improvement in an electrode holder adapted for use in arc welding operations. It is an object of the present invention to provide electrode holders of this class which will be simple in structure, economical of manufacture, durable, compact and light.

It is another object of the present invention to provide an electrode holder so constructed and arranged that a tight clamping of the electrode is assured during the welding operation.

Another object of the invention is the provision of an electrode holder so constructed and arranged that it may be easily and economically insulated from contact with exterior objects.

Another object of the invention is the provision of an electrode holder so constructed and arranged that it will be free from outward projections and insertable into narrow places.

Other objectives will appear hereinafter.

It is recognized that various modifications and changes may be made in the detail of structure illustrated without departing from the invention, and it is intended that such specifications and modifications shall be encompassed within the scope of the claims which form a part hereof.

From a part of the specifications and drawing in which,

Fig. 1 is a longitudinal, central, sectional, vertical view of the invention.

Fig. 2 is a sectional view taken on line 2—2 of Fig. 1.

Fig. 3 is a sectional view taken on line 3—3 of Fig. 1.

Fig. 4 is a fragmentary sectional view taken on line 4—4 of Fig. 1.

Fig. 5 is a fragmentary sectional view taken on line 5—5 of Fig. 1.

Fig. 6 is a fragmentary view similar to Fig. 4 showing a slight modification of the invention.

As shown in the drawing, I provide a handgrip or handle 9 made from suitable insulating material, such as fiber or the like. Securely mounted in this handle 9 is a shank 10 formed from metal and preferably copper or a metal of high electrical conductivity.

A socket 11 is formed in the forward end of shank 10 and relatively engaged in the socket 11 is a metallic tubular member 12, formed preferably from copper or other metal of high electrical conductivity. An axially directed slot 17 is formed at the forward end of the tube 12, and engaging in this slot 12 is a lateral projection 13 extending radially outwardly from end of a rod 14, which projects through the bore 15 of the tube 12 and which is threaded into a threaded bore 16 formed in the shank 10.

It will be noted that the slot 17 is of greater length than the projection 13, so that the member 13 has axial play in the slot 17. Enclosing the member 12, as well as the radial projection 13, is an elongated cup-shaped member 18 formed from suitable heat and electrical insulating material such as fiber or the like.

In use the bared end 19 of a cable or electrical conductor 20 is inserted into the bore 21, formed in the rear end of the shank 10 and retained therein by the use of solder 22 or in any other suitable manner.

Formed diametrically through the member 12 and the rod 15 are aligned passages 23, 24 and 25, which are aligned with the openings 26 and 27 formed in the insulated covering 18.

The construction is such that when the passages 23, 24 and 25 are in alignment with each other and in alignment with the openings 26 and 27, the bared end of an electrode or welding rod may be projected through these openings and these passages. A relative rotation of the member 12 and the shank 10 will then effect a thread of the rod 14 into the shank 10 or out of it, this rod 14 being forced to rotate in unison with the member 12 because of the engagement of the member 13 in the slot 17. The covering 18 is fixedly mounted in the member 12 so that the operator, in order to effect the relative rotation of the parts referred to, could hold the handle 9 in one hand and rotate the member 18 with the other hand. When the rotation is in the direction so that the rod 14 would thread into the shank 10, the passage 25 would move out of alignment with the passages 23 and 24, thus securely clamping a wire which may be projected through said passages in fixed relation on the holder and holding it fixed so that it would be securely held in position during a welding operation. To release the rod for replacement with a new one, a reversal of rotation of the parts would be required. This movement, of course, is a slight one so that the rod may be quickly and easily removed and replaced.

In Fig. 6, I have shown a slightly modified form of the structure in which the passages 23' and 24' are lined with bushings 28 and 29 respectively, these bushings being formed from some wear resisting material such as bronze or the like. The other similar parts bear similar reference numerals to those shown in Fig. 4, excepting that they are primed. The operation of the form shown in Fig. 6 is, of course, the same as that shown in Fig. 4.

It will appear obvious that the device is compact and that it may be inserted into narrow places, since it is free from operating levers and similar outward projections. Due to the construction, the holder may also be made extremely light. It will be noted that the member 12 and the rod 14 serve as conductors for conducting the current to the rod, which may be projected through the passages to which reference is made. With this form of construction, I am enabled to carry practically the complete current from the shank 10 to the rod which may be inserted in the passages to which reference is made. This results in a cool handle 9 and a highly efficient welding device in operation.

What I claim as new is:

1. An electrode holder of the class described, comprising: a tubular handle formed from suitable insulating material; a metallic shank mounted fixedly in said handle and adapted for attachment to an electric conductor, said shank having a threaded socket formed in its forward end; a tubular metal member embraced at one end by a bore in said socket, said tubular metal member having a longitudinally directed bore formed therein; a rod extending through the bore in said tubular member and being threaded at one end into said socket; a radial projection at one end of said rod; a slot in said metal tubular member adapted to accommodate said radial projection on said rod, said tubular member and said rod having registering radial openings formed in their forward ends for passage of an electrode wire therethrough, the axial movement of said rod relatively to said tubular member effecting a clamping of said rod in said openings.

2. An electrode holder of the class described comprising, a handle; a metallic shank fixedly mounted in said handle and adapted for attachment to an electric conductor and having a threaded socket formed in its forward end; a tubular metallic member engaging the forward end of said socket and projecting forwardly thereof and rotatable relatively thereto; a radial slot in said tubular member, a rod extending through said tubular member and threaded into said socket, a radial projection on said rod slidably engaging the slot of said tubular member, said rod and said tubular member having registering radial openings formed therein for passage of an electrode therethrough; whereby the rotation of said rod in unison with said tubular member relatively to said shank causes axial movement of said rod to effect a binding of said electrode in said openings.

3. In an electrode holder of the class described, a tubular handle of insulating material; a metallic shank fixedly mounted in said handle and adapted for attachment to an electric conductor and having a threaded socket in its forward end; a tubular metallic member engaging the forward end of said shank and projecting forwardly thereof and having a longitudinally directed slot formed adjacent its end and provided with a pair of diametrically opposite openings; a rod threaded into said socket and extended through said tubular member and having an opening adjacent one end registering with the openings in said tubular member; a projection on said rod slidably engaging the slot in said tubular member, whereby the rotation of either said handle or said tubular member relative to one another effects the axial movement of said rod with respect to said tubular member and said socket.

4. In an electrode holder of the class described, a tubular handle of insulating material; a metallic shank fixedly mounted in said handle and adapted for attachment to an electric conductor and having a threaded socket in its forward end; a tubular metallic member engaging the forward end of said shank and projecting forwardly thereof and having a longitudinally directed slot formed adjacent its end, and being provided with a pair of diametrically opposite openings; a rod threaded into said socket and extended through said tubular member and having an opening adjacent one end registering with the openings in said tubular member; means carried by the rod and slidably engageable with the slot of said tubular member, whereby rotation of said socket causes the axial movement of said rod with respect to said tubular member; and insulating means for covering said tubular member and the end of said rod.

5. In a device of the character described, the combination of a tubular handle of insulating material; a metallic shank fixedly mounted in said handle and adapted to be attached to an electric conductor; a threaded bore in said shank; a counter bore in said shank; a metallic tubular member having one end in engagement with said counter bore; a rod extending through said tubular member and having threads to engage said threaded bore; an insulating cap extending into said insulating handle and covering the free ends of said metallic tubular member and said rod; and alignable radial passages through said cap, said metallic tubular member and said rod.

LEWIS P. DEMPSEY.